(12) United States Patent
Aoki et al.

(10) Patent No.: US 8,050,851 B2
(45) Date of Patent: Nov. 1, 2011

(54) POWER OUTPUT APPARATUS, VEHICLE EQUIPPED WITH POWER OUTPUT APPARATUS, DRIVING SYSTEM, AND CONTROL METHOD OF POWER OUTPUT APPARATUS

(75) Inventors: Takanori Aoki, Nissin (JP); Tomokazu Nomura, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 478 days.

(21) Appl. No.: 12/363,204

(22) Filed: Jan. 30, 2009

(65) Prior Publication Data

US 2009/0204314 A1    Aug. 13, 2009

(30) Foreign Application Priority Data

Feb. 13, 2008  (JP) .................................. 2008-32075

(51) Int. Cl.
*G06F 19/00* (2006.01)
*B60K 1/02* (2006.01)
*F02D 17/04* (2006.01)
*F02N 11/08* (2006.01)

(52) U.S. Cl. ............ 701/112; 701/102; 477/3; 903/905; 903/960; 123/179.4

(58) Field of Classification Search .............. 123/179.3, 123/179.4, 198 R, 198 D, 198 DB, 198 DC, 123/198 F, 481; 701/101–105, 112, 113–115; 477/3; 180/65.28, 65.285; 903/905, 906, 960; 60/698, 712, 716; 307/10.6

See application file for complete search history.

(56) References Cited

U.S. PATENT DOCUMENTS

| | | | | |
|---|---|---|---|---|
| 6,564,765 | B2 * | 5/2003 | Kuroda et al. | 123/179.4 |
| 6,671,612 | B2 * | 12/2003 | Fuse | 701/112 |
| 7,291,093 | B2 * | 11/2007 | Yamamoto et al. | 903/960 |
| 7,445,066 | B2 * | 11/2008 | Hommi et al. | 180/65.285 |

FOREIGN PATENT DOCUMENTS

| | | | | |
|---|---|---|---|---|
| JP | 2000257498 | A | * | 9/2000 |
| JP | 2002-058113 | A |   | 2/2002 |
| JP | 2003148313 | A | * | 5/2003 |
| JP | 2006022710 | A | * | 1/2006 |
| JP | 2008030586 | A | * | 2/2008 |

* cited by examiner

*Primary Examiner* — Willis Wolfe, Jr.
(74) *Attorney, Agent, or Firm* — Kenyon & Kenyon LLP

(57) ABSTRACT

In a hybrid vehicle, once an engine is started in response to prohibition of an operation stop of the engine based on a deterioration factor, the operation stop of the engine is not allowed irrespective of the value of the deterioration factor D until elapse of a certain time period since the start of the engine. The deterioration factor has an increase according to discharge of a battery and a decrease according to charge of the battery and represents start of deterioration of the battery when exceeding a specific reference value. Such prohibition of the engine operation stop prevents a stop of the engine within a relatively short time period after a start of the engine based on the deterioration factor. This arrangement effectively prevents the driver from feeling odd and uncomfortable due to frequent stops and starts of the engine based on the deterioration factor, which is not apparently correlated to the driver's accelerating operations.

13 Claims, 9 Drawing Sheets

POWER OUTPUT APPARATUS, VEHICLE EQUIPPED WITH POWER OUTPUT APPARATUS, DRIVING SYSTEM, AND CONTROL METHOD OF POWER OUTPUT APPARATUS

This application claims priority to Japanese Patent Application No. 2008 -32075 filed 13 Feb. 2008, the content of which is incorporated herein by reference.

BACKGROUND OF THE INVENTION

1. Field of the Invention

The present invention relates to a power output apparatus, a vehicle equipped with the power output apparatus, a driving system, and a control method of the power output apparatus.

2. Description of the Prior Art

In a power output apparatus for a hybrid vehicle equipped with an internal combustion engine and a driving motor arranged to output a driving power and with a motor arranged to crank and start the internal combustion engine, one proposed technique computes a battery output demand based on a drive point of the internal combustion engine and a torque command of the driving motor, which are set corresponding to an output demand for a driveshaft. When the output demand exceeds a rated power of a battery, the proposed technique corrects the torque command of the driving motor to keep the output demand at or below an instantaneous output set based on the state of charge of the battery and a battery temperature (see Japanese Patent Laid-Open No. 2002-058113). The power output apparatus of this prior art technique controls the internal combustion engine and the driving motor to operate the internal combustion engine at the set drive point and operate the driving motor with the set or corrected torque command during only an allowable output time. Compared with a system of restricting the output limit of the battery to its rated power, this proposed technique ensures sufficient exertion of the battery performance and allows size reduction of the battery and the whole power output apparatus.

The battery adopted for an accumulator of the power output apparatus generally has a lower limit voltage in a specific voltage range that ensures sufficient battery performance without deterioration. Some type of the battery may start deterioration by continuous discharge at a high current level even when the output voltage has not yet reached the lower limit voltage. In the power output apparatus equipped with such a battery, there is a potential that continuous discharge of the battery at a high current level may cause a start of deterioration of the battery in the course of power output from only the driving motor with the operation of the internal combustion engine stopped. It is thus desirable to start the operation of the internal combustion engine according to the state of the battery. There is, however, a conflicting requirement for the improved fuel consumption in the power output apparatus. It is thus required to balance protection of the battery with improvement of the fuel consumption.

SUMMARY OF THE INVENTION

In the power output apparatus, the vehicle equipped with the power output apparatus, the driving system, and the control method of the power output apparatus, there would thus be a demand for improving the fuel consumption while preventing deterioration of an accumulator.

The present invention accomplishes at least part of the demands mentioned above and the other relevant demands by the following configurations applied to the power output apparatus, the vehicle equipped with the power output apparatus, the driving system, and the control method of the power output apparatus.

According to one aspect, the invention is directed to a power output apparatus constructed to output power to at least one driveshaft. The power output apparatus includes: an internal combustion engine arranged to output power to the driveshaft; a motor arranged to input and output power from and to the driveshaft; an accumulator arranged to transmit electric power to and from the motor; a deterioration factor computation module configured to compute a deterioration factor based on a value of electric current flowing through the accumulator, the deterioration factor has characteristic of increasing in accordance with discharge of the accumulator and decreasing in accordance with charge of the accumulator, and the deterioration factor represents start of deterioration of the accumulator when exceeding a specific reference value; an engine operation stop prohibition module configured to prohibit an operation stop of the internal combustion engine when the computed deterioration factor reaches or exceeds a preset operation stop prohibition threshold value that is smaller than the specific reference value; an engine operation stop permission module configured to allow the operation stop of the internal combustion engine when the computed deterioration factor decreases to or below a preset operation stop permission threshold value that is smaller than the specific reference value, after prohibition of the operation stop of the internal combustion engine by the engine operation stop prohibition module; a driving force demand setting module configured to set a driving force demand required for the driveshaft; and a controller configured to control the internal combustion engine and the motor so that power based on the set driving force demand is outputted to the driveshaft with an operation of the internal combustion engine in response to prohibition of the operation stop by the engine operation stop prohibition module or with the operation stop of the internal combustion engine in response to permission of the operation stop by the engine operation stop permission module.

The power output apparatus according to this aspect of the invention computes the deterioration factor based on the value of electric current flowing through the accumulator. The deterioration factor has characteristic of increasing in accordance with discharge of the accumulator and decreasing in accordance with charge of the accumulator, and the deterioration factor represents start of deterioration of the accumulator when exceeding a specific reference value. When the computed deterioration factor reaches or exceeds the preset operation stop prohibition threshold value that is smaller than the specific reference value, the operation stop of the internal combustion engine is prohibited. The internal combustion engine and the motor are then controlled to ensure output of the power equivalent to the driving force demand to the driveshaft, accompanied with operation (including a start) of the internal combustion engine. After prohibition of the operation stop of the internal combustion engine based on the deterioration factor, when the computed deterioration factor decreases to or below the preset operation stop permission threshold value that is smaller than the specific reference value, the operation stop of the internal combustion engine is allowed. The internal combustion engine and the motor are then controlled to ensure output of the power equivalent to the driving force demand to the driveshaft, accompanied with the operation or the operation stop of the internal combustion engine. The power output apparatus of this configuration operates the internal combustion engine in response to an increase of the deterioration factor to or above the preset operation stop prohibition threshold value that is smaller than the specific reference value. This arrangement restricts the discharge from the accumulator to lower the amount of discharge current and thereby effectively prevents deterioration of the accumulator due to the continuous discharge. The power output apparatus of this configuration allows the operation stop of the internal combustion engine in response to a decrease of the deterioration factor to or below the preset operation stop permission threshold value that is smaller than the specific reference value even after prohibition of the operation stop of the internal combustion engine based on the deterioration factor. This arrangement adequately stops the operation of the internal combustion engine and thereby improves the fuel consumption. The power output apparatus according to the invention thus improves the fuel consumption while preventing deterioration of the accumulator.

In one preferable application of the power output apparatus according to the above aspect of the invention, the engine operation stop permission module does not allow the operation stop of the internal combustion engine irrespective of the value of the computed deterioration factor until elapse of a certain time period since the start of the internal combustion engine, when the internal combustion engine is started in response to prohibition of the operation stop of the internal combustion engine by the engine operation stop prohibition module in an operation stop state of the internal combustion engine. In the case of a decrease of the deterioration factor to or below the preset operation stop permission threshold value after the prohibition of the operation stop of the internal combustion engine based on the value of the deterioration factor, limitless permission of the operation stop of the internal combustion engine may cause frequent stops and restarts of the internal combustion engine. By taking into account this potential, once the internal combustion engine is started in response to prohibition of the operation stop of the internal combustion engine based on the value of the deterioration factor, the power output apparatus of this application does not allow the operation stop of the internal combustion engine irrespective of the value of the deterioration factor until elapse of the certain time period since the start of the internal combustion engine, when the internal combustion engine is started in response to prohibition of the operation stop of the internal combustion engine by the engine operation stop prohibition module in an operation stop state of the internal combustion engine. Such prohibition of the engine operation stop prevents a stop of the internal combustion engine within a relatively short time period after a start of the internal combustion engine based on the deterioration factor. This arrangement effectively prevents the driver from feeling odd and uncomfortable due to frequent stops and starts of the internal combustion engine.

In another preferable application of the power output apparatus according to the above aspect of the invention, the operation of the internal combustion engine is stopped upon satisfaction of a predetermined engine stop condition when the operation stop of the internal combustion engine is allowed by the engine operation stop permission module.

In still another preferable application of the power output apparatus according to the above aspect of the invention, the internal combustion engine is started upon satisfaction of a predetermined engine start condition when the computed deterioration factor is less than the preset operation stop prohibition threshold value in the operation stop state of the internal combustion engine, and the internal combustion engine is started irrespective of satisfaction or dissatisfaction of the predetermined engine start condition when the computed deterioration factor is not less than the operation stop prohibition threshold value in the operation stop state of the internal combustion engine.

In the power output apparatus of the invention, the deterioration factor may be a value on an integrated value of charge-discharge current flowing through the accumulator. The deterioration factor increases by continuous discharge of the accumulator and decreases by continuous charge of the accumulator. The deterioration factor can thus be obtained to adequately represent the degree of deterioration of the accumulator.

In one preferable embodiment of the invention, the power output apparatus further has an electric power-mechanical power input output assembly connected with the driveshaft and with an engine shaft of the internal combustion engine and configured to output at least part of the output power of the internal combustion engine to the driveshaft and transmit electric power to and from the accumulator through input and output of electric power and mechanical power. In one preferable structure of this embodiment, the electric power-mechanical power input output assembly has: a motor for power generation capable of inputting and outputting power; and a three shaft-type power input output structure connected to three shafts, the driveshaft, the engine shaft of the internal combustion engine, and a rotating shaft of the motor for power generation, and adopted to input and output power to a residual shaft based on powers input from and output to any two shafts among the three shafts.

In the power output apparatus of the invention, the accumulator may be a lithium ion battery. The lithium ion battery is characteristic of starting deterioration due to continuous discharge at a high current level even when the output voltage has not yet reached to a predetermined lower limit voltage. The technique of the invention is thus especially preferable for the power output apparatus including the lithium ion battery as the accumulator. The deterioration factor is, however, not restricted to the lithium ion battery but is computable with regard to various other types of batteries, for example, a nickel hydrogen battery. The power output apparatus of the invention may thus be equipped with any suitable type of the accumulator other than the lithium ion battery.

According to another aspect, the invention is also directed to a vehicle with drive wheels connected to a driveshaft. The vehicle includes: an internal combustion engine arranged to output power to the driveshaft; a motor arranged to input and output power from and to the driveshaft or another axle different from the driveshaft; an accumulator arranged to transmit electric power to and from the motor; a deterioration factor computation module configured to compute a deterioration factor based on a value of electric current flowing through the accumulator, the deterioration factor has characteristic of increasing in accordance with discharge of the accumulator and decreasing in accordance with charge of the accumulator, and the deterioration factor represents start of deterioration of the accumulator when exceeding a specific reference value; an engine operation stop prohibition module configured to prohibit an operation stop of the internal combustion engine when the computed deterioration factor reaches or exceeds a preset operation stop prohibition threshold value that is smaller than the specific reference value; an engine operation stop permission module configured to allow the operation stop of the internal combustion engine when the computed deterioration factor decreases to or below a preset operation stop permission threshold value that is smaller than the specific reference value, after prohibition of the operation stop of the internal combustion engine by the engine operation stop prohibition module; a driving force demand setting module configured to set a driving force demand required for the driveshaft; and a controller configured to control the internal combustion engine and the motor so that power based on the set driving force demand is outputted to the driveshaft with an operation of the internal combustion engine in response to prohibition of the operation stop by the engine operation stop prohibition module or with the operation stop of the internal combustion engine in response to permission of the operation stop by the engine operation stop permission module. The vehicle of this configuration improves the fuel consumption while preventing deterioration of the accumulator.

According to still another aspect, the invention is further directed to a driving system incorporated with an internal combustion engine and an accumulator in a power output apparatus constructed to output power to at least one driveshaft. The driving system includes: a motor arranged to transmit electric power to and from the accumulator and to output power to the driveshaft; a deterioration factor computation module configured to compute a deterioration factor based on a value of electric current flowing through the accumulator, the deterioration factor has characteristic of increasing in accordance with discharge of the accumulator and decreasing in accordance with charge of the accumulator, and the deterioration factor represents start of deterioration of the accumulator when exceeding a specific reference value; an engine operation stop prohibition module configured to prohibit an operation stop of the internal combustion engine when the computed deterioration factor reaches or exceeds a preset operation stop prohibition threshold value that is smaller than the specific reference value; an engine operation stop permission module configured to allow the operation stop of the internal combustion engine when the computed deterioration factor decreases to or below a preset operation stop permission threshold value that is smaller than the specific reference value, after prohibition of the operation stop of the internal combustion engine by the engine operation stop prohibition module; a driving force demand setting module configured to set a driving force demand required for the driveshaft; and a controller configured to control the internal combustion engine and the motor so that power based on the set driving force demand is outputted to the driveshaft with an operation of the internal combustion engine in response to prohibition of the operation stop by the engine operation stop prohibition module or with the operation stop of the internal combustion engine in response to permission of the operation stop by the engine operation stop permission module.

The driving system according to the above aspect of the invention operates the internal combustion engine in response to an increase of the deterioration factor to or above the preset operation stop prohibition threshold value that is smaller than the specific reference value. This arrangement restricts the discharge from the accumulator to lower the amount of discharge current and thereby effectively prevents deterioration of the accumulator due to the continuous discharge. The driving system of the above configuration allows the operation stop of the internal combustion engine in response to a decrease of the deterioration factor to or below the preset operation stop permission threshold value that is smaller than the specific reference value even after prohibition of the operation stop of the internal combustion engine based on the deterioration factor. This arrangement adequately stops the operation of the internal combustion engine and thereby improves the fuel consumption. The driving system according to the invention thus improves the fuel consumption while preventing deterioration of the accumulator.

According to another aspect, the invention is also directed to a control method of a power output apparatus that includes: at least one drive shaft; an internal combustion engine arranged to output power to the driveshaft; a motor arranged to input and output power from and to the driveshaft; and an accumulator arranged to transmit electric power to and from the motor. The control method computes a deterioration factor based on a value of electric current flowing through the accumulator, the deterioration factor has characteristic of increasing in accordance with discharge of the accumulator and decreasing in accordance with charge of the accumulator, and the deterioration factor represents start of deterioration of the accumulator when exceeding a specific reference value. The control method prohibits an operation stop of the internal combustion engine when the computed deterioration factor reaches or exceeds a preset operation stop prohibition threshold value that is smaller than the specific reference value, and allowing the operation stop of the internal combustion engine when the computed deterioration factor decreases to or below a preset operation stop permission threshold value that is smaller than the specific reference value, after prohibition of the operation stop of the internal combustion engine based on the deterioration factor. The control method controls the internal combustion engine and the motor so that power based on a driving force demand which is required for the driveshaft is outputted to the driveshaft with an operation or the operation stop of the internal combustion engine in response to prohibition or permission of the operation stop of the internal combustion engine.

The control method of the power output apparatus according to the above aspect of the invention operates the internal combustion engine in response to an increase of the deterioration factor to or above the preset operation stop prohibition threshold value that is smaller than the specific reference value. This arrangement restricts the discharge from the accumulator to lower the amount of discharge current and thereby effectively prevents deterioration of the accumulator due to the continuous discharge. The control method of the above configuration allows the operation stop of the internal combustion engine in response to a decrease of the deterioration factor to or below the preset operation stop permission threshold value that is smaller than the specific reference value even after prohibition of the operation stop of the internal combustion engine based on the deterioration factor. This arrangement adequately stops the operation of the internal combustion engine and thereby improves the fuel consumption. The control method of the power output apparatus according to the invention thus improves the fuel consumption while preventing deterioration of the accumulator.

DESCRIPTION OF THE PREFERRED EMBODIMENTS

One mode of carrying out the invention is described below as a preferred embodiment with reference to the accompanied drawings.

Figure 1:
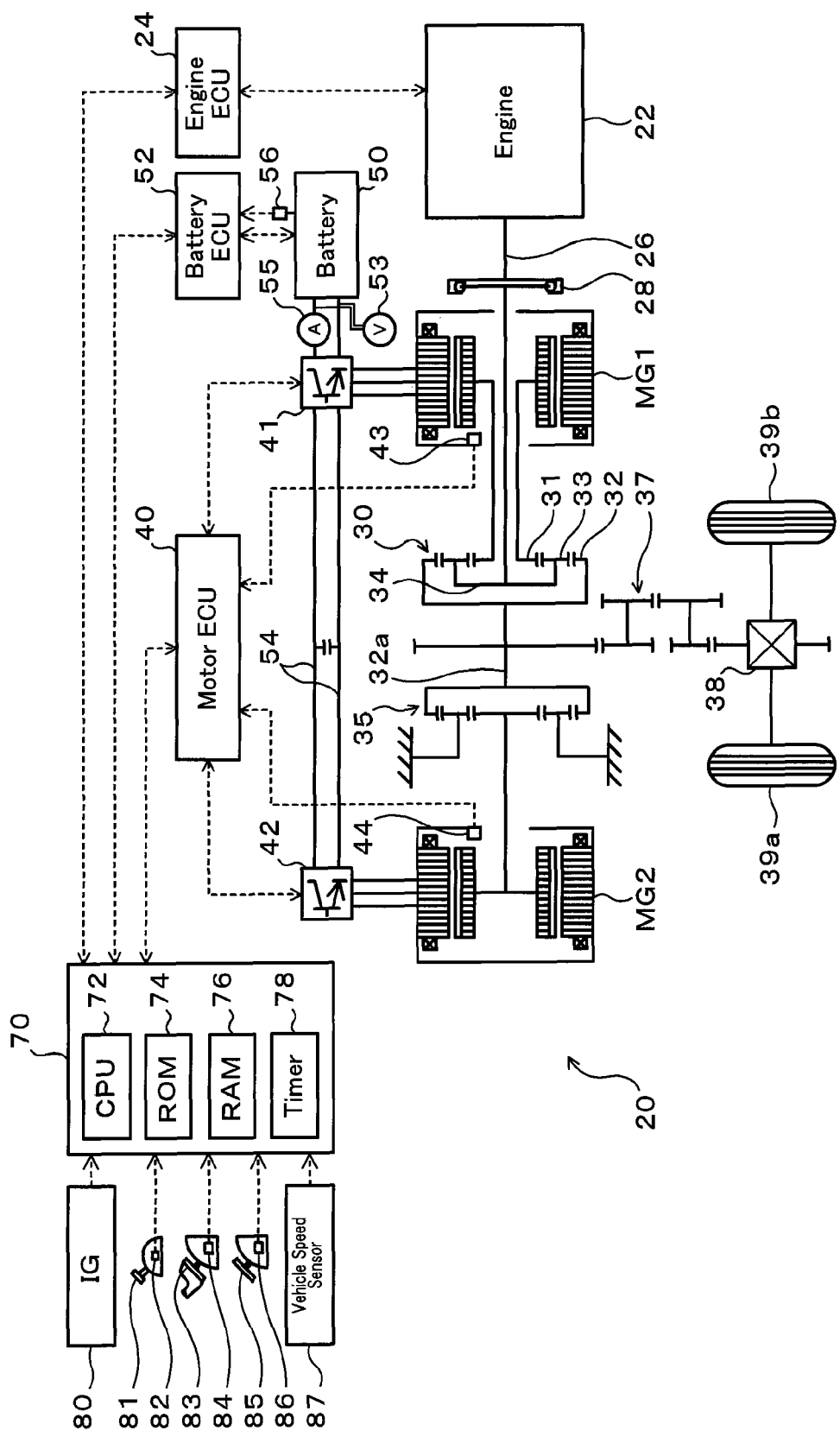
FIG. 1 schematically illustrates the configuration of a hybrid vehicle as one embodiment of the vehicle according to the invention.

FIG. 1 schematically illustrates the configuration of a hybrid vehicle 20 as one embodiment of the vehicle according to the invention. The hybrid vehicle 20 of the illustrated configuration includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the ring gear shaft 32a via the reduction gear 35, and a hybrid electronic control unit 70 (hereafter referred to as hybrid ECU) configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and air intake control, of an engine electronic control unit 24 (hereafter referred to as engine ECU). The engine ECU 24 inputs diverse signals from various sensors provided for the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as the engine-side rotational element, the sun gear 31, and the ring gear 32 as the axle-side rotational element in the power distribution integration mechanism 30 are respectively linked to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 transmit electric power to and from a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereafter referred to as motor ECU). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotation speeds Nm1 and Nm2 of the rotors in the motors MG1 and MG2 according to a rotation speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

Figure 2:
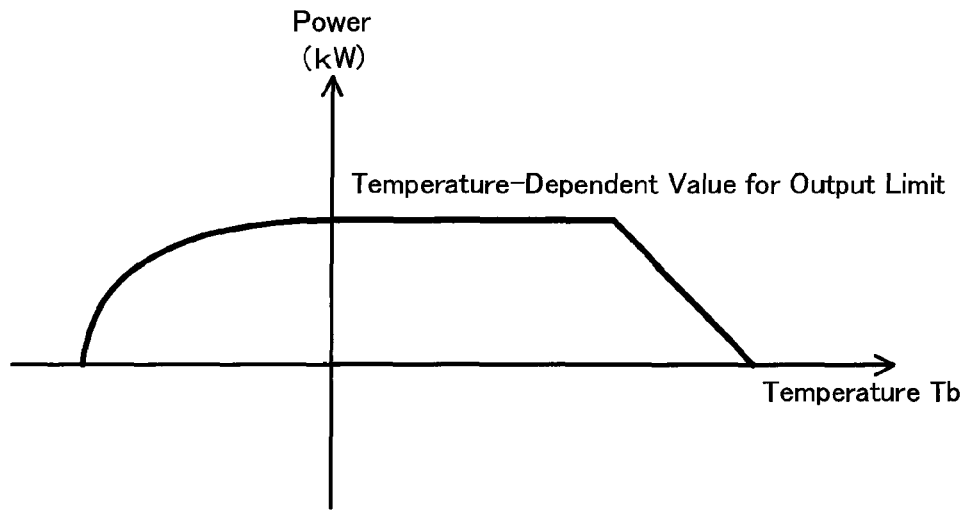
FIG. 2 is a graph showing a variation in temperature-dependent value for an output limit of a battery against the battery temperature Tb.
Figure 3:
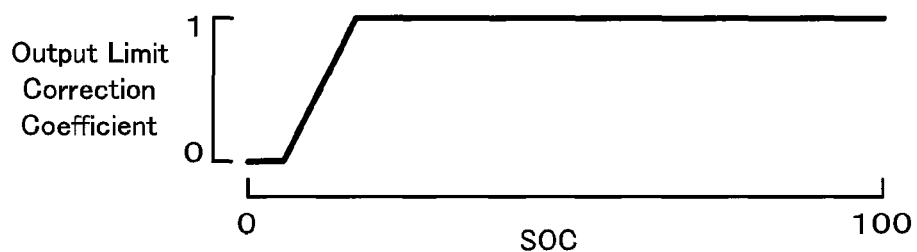
FIG. 3 is a graph showing a variation in output limit correction coefficient against the state of charge SOC of the battery.

The battery 50, a lithium ion battery in this embodiment, is under control and management of a battery electronic control unit 52 (hereafter referred to as battery ECU). The battery ECU 52 inputs various signals required for management and control of the battery 50, for example, an inter-terminal voltage Vb from a voltage sensor 53 located between terminals of the battery 50, a charge-discharge current Ib from a current sensor 55 located in the power line 54 connecting with the output terminal of the battery 50, and a battery temperature Tb from a temperature sensor 56 attached to the battery 50. The battery ECU 52 outputs data regarding the operating conditions of the battery 50 by data communication to the hybrid ECU 70 and the engine ECU 24 according to the requirements. The battery ECU 52 also performs various arithmetic operations for management and control of the battery 50. A remaining charge or state of charge SOC of the battery 50 is calculated from an integrated value of the charge-discharge current Ib measured by the current sensor 55. A charge-discharge power demand Pb* is set based on the calculated state of charge SOC of the battery 50. An input limit Win as an allowable charging electric power to be charged in the battery 50 and an output limit Wout as an allowable discharging electric power to be discharged from the battery 50 are set corresponding to the calculated state of charge SOC and the battery temperature Tb. The input and output limits Win and Wout of the battery 50 are basically set by multiplying a temperature-dependent value depending on the battery temperature Tb by an input limit correction coefficient or an output limit correction coefficient based on the state of charge SOC of the battery 50. One specific procedure of setting the output limit Wout calculates an output limit base value Woutb as the product of the temperature-dependent value and the output limit correction coefficient and adequately corrects the calculated output limit base value Woutb to determine the final output limit Wout. FIG. 2 is a graph showing a variation in temperature-dependent value for the output limit of the battery 50 against the battery temperature Tb. FIG. 3 is a graph showing a variation in output limit correction coefficient against the state of charge SOC of the battery 50.

The hybrid ECU 70 is constructed as a microprocessor including a CPU 72, a ROM 74 configured to store processing programs, a RAM 76 configured to temporarily store data, a timer 78 designed to perform time counting in response to a time count command, input and output ports (not shown), and a communication port (not shown). The hybrid ECU 70 inputs, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. The hybrid ECU 70 makes connection with the engine ECU 24, the motor ECU 40, and the battery ECU 52 via its communication port to transmit various control signals and data to and from the engine ECU 24, the motor ECU 40, and the battery ECU 52 as mentioned previously.

The hybrid vehicle 20 of the embodiment constructed as described above sets a torque demand, which is to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22 and the motors MG1 and MG2 to ensure output of a torque equivalent to the preset torque demand to the ring gear shaft 32a. There are several drive control modes of the engine 22 and the motors MG1 and MG2. In a torque conversion drive mode, while the engine 22 is driven and controlled to ensure output of a power equivalent to the torque demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to ensure output of a power corresponding to the sum of the torque demand and an electric power required for charging the battery 50 or an electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30 and the motors MG1 and MG2 and to ensure output of a torque equivalent to the torque demand to the ring gear shaft 32a. In a motor drive mode, the motor MG2 is driven and controlled to ensure output of a power equivalent to the torque demand to the ring gear shaft 32a, while the engine 22 stops its operation. The hybrid vehicle 20 of the embodiment performs intermittent operations of the engine 22 to automatically stop and restart the operation of the engine 22 upon satisfaction of a predetermined condition in the torque conversion drive mode or in the charge-discharge drive mode.

Figure 4:
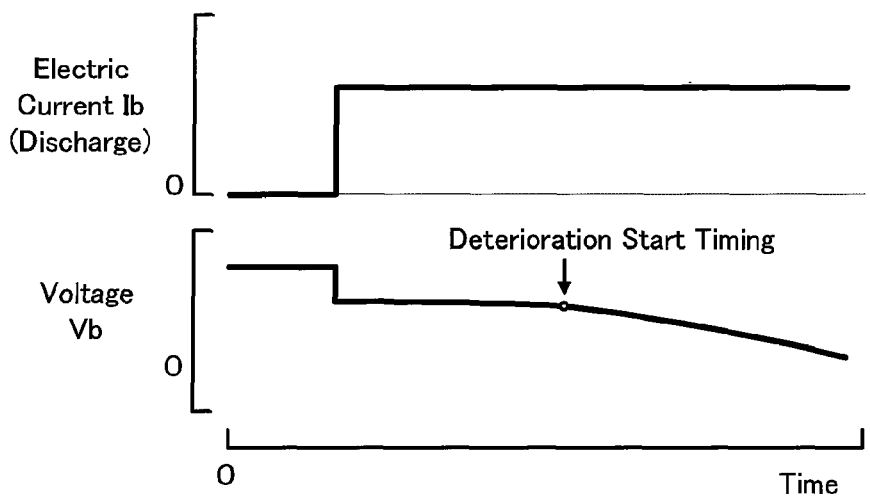
FIG. 4 is a graph showing characteristic curves of the battery.

The lithium ion battery is adopted for the battery 50 mounted on the hybrid vehicle 20 of the embodiment as mentioned previously. As is known to those skilled in the art, the lithium ion battery starts deterioration due to the continuous discharge at a high current level, even when the inter-terminal voltage Vb has not yet reached a lower limit voltage in a specific voltage range of ensuring sufficient battery performances. Namely the lithium ion battery has a relatively abrupt decrease of the inter-terminal voltage Vb with an elapse of time from a certain timing as shown in FIG. 4 in the state of continuous discharge at a relatively high (constant) current level. By taking into account this characteristic of the lithium ion battery, it is assumed in the embodiment that the battery 50 starts deterioration at a deterioration start timing when the inter-terminal voltage Vb shows a relatively abrupt decrease with an elapse of time and that the deterioration start timing does not come until a deterioration factor D expressed by a differential equation of Equation (1) given below exceeds a specific reference value:

$$dD/dt + \alpha \cdot D = \beta \cdot Ib \quad (1)$$

Laplace transform of both sides of Equation (1) gives a transfer function of Equation (2):

$$D = (\beta/\alpha)/(s/\alpha+1) - \pounds[Ib] \quad (2)$$

In Equations (1) and (2), coefficients 'α' and 'β' represent parameters depending upon the battery temperature Tb and the state of charge SOC of the battery 50. The deterioration factor D is obtained as the product of an integrated value of the charge-discharge current Ib and a coefficient κ set based on the coefficients α and β, that is, based on the battery temperature Tb and the state of charge SOC, as expressed by Equation (3):

$$D = \kappa \cdot \smallint Ib \cdot dt \quad (3)$$

The deterioration factor D increases by continuous discharge of the battery 50 at a high current level, and gradually decreases by continuous charge of the battery 50. The procedure of the embodiment sets a restriction start threshold value (control object value) Dtag that is smaller than the specific reference value. When the deterioration factor D reaches or exceeds the restriction start threshold value Dtag, feedback control (PI control) is performed based on the difference between the restriction start threshold value Dtag and the deterioration factor D to set the output limit Wout of the battery 50 according to Equation (4) given below:

$$Wout = Woutb + Kp \cdot (Dtag - D) + Ki \cdot \smallint (Dtag - D) \cdot dt \quad (4)$$

Figure 8:
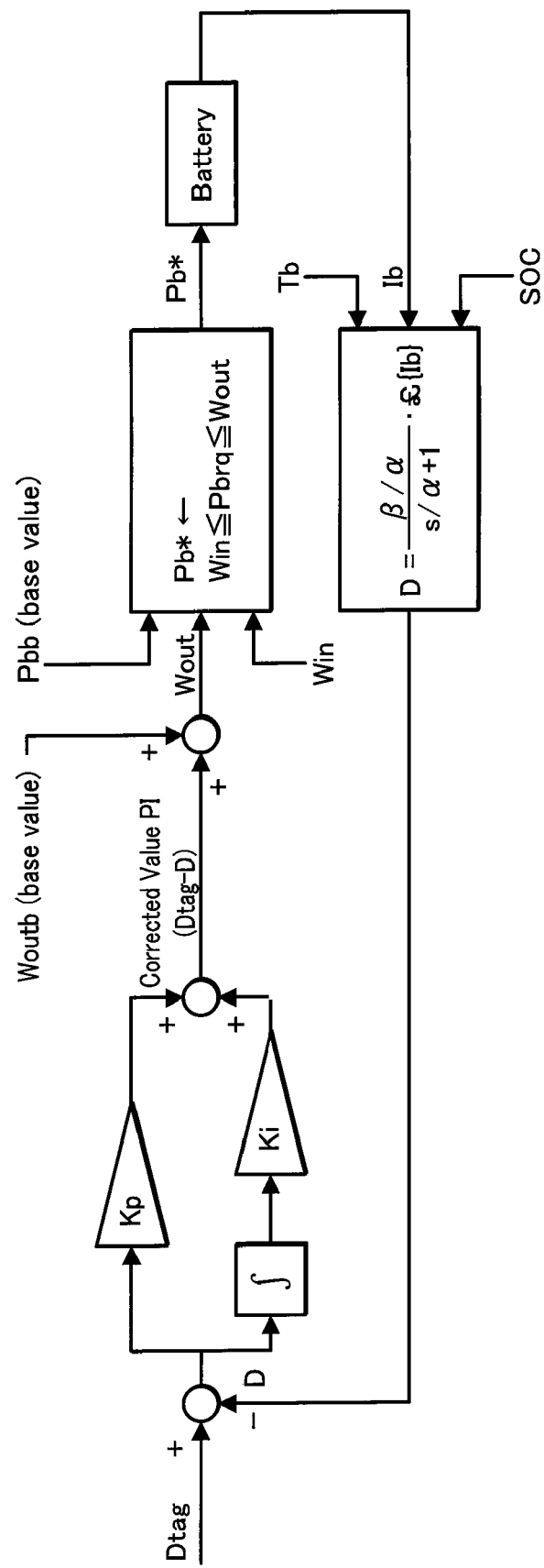
FIG. 8 is a block diagram showing the configuration of a control system involved in setting of the output limit Wout by a battery ECU.

Such control keeps the deterioration factor D at or below the specific reference value and prevents the deterioration start timing of the battery 50 from coming. In Equation (4) given above, 'Kp' in the second term and 'Ki' in the third term on the right side respectively denote a gain of the proportional and a gain of the integral term. A concrete procedure of setting the coefficient κ in this embodiment provides and stores in advance variations in coefficient κ against the battery temperature Tb and the state of charge SOC as a coefficient setting map in the ROM 74 and reads the coefficient κ corresponding to the battery temperature Tb and the state of charge SOC given for computation of the deterioration factor D from the map. In the configuration of the embodiment, the battery ECU 52 performs the series of operations for setting the output limit Wout including computation of the deterioration factor D. Fundamentally the greater difference between the restriction start threshold value Dtag and the deterioration factor D results in setting the smaller value to the output limit Wout (charge-discharge current Ib). FIG. 8 is a block diagram showing the configuration of a control system involved in setting of the output limit Wout by the battery ECU 52. The restriction of the output limit Wout based on the deterioration factor D is performed until the deterioration factor D decreases to or below a certain threshold value that is smaller than the restriction start threshold value Dtag.

Figure 5:
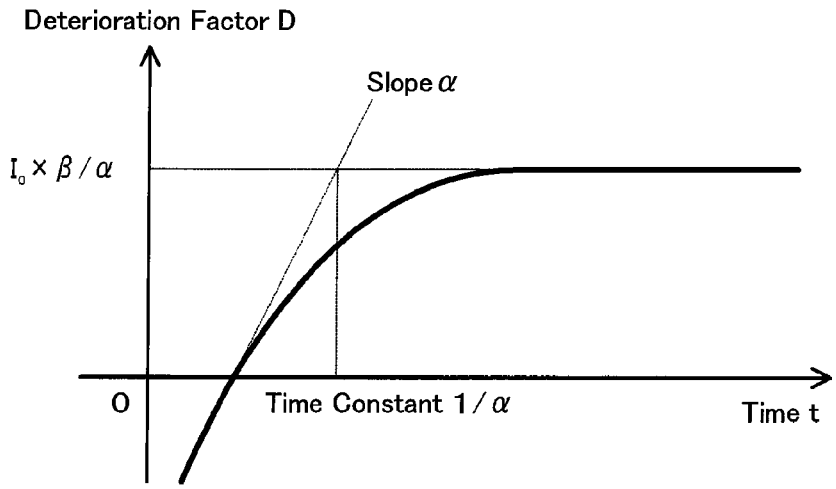
FIG. 5 is a graph showing a response of a deterioration factor D to a unit step input of electric current Ib.
Figure 6:
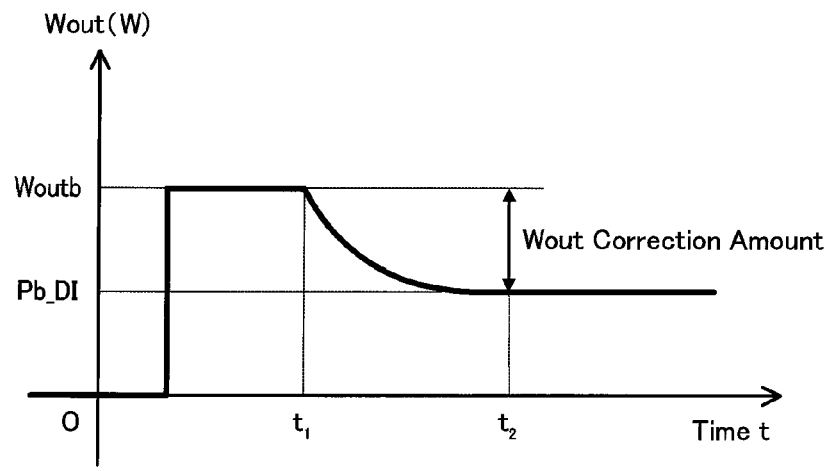
FIG. 6 is a graph showing a variation in output limit Wout with restriction of the output limit Wout based on the deterioration factor D.

The following describes a concrete procedure of setting the restriction start threshold value Dtag and the gains in Equation (4) given above. According to the transfer function of Equation (2), the deterioration factor D converges to a value β/α at a time constant 1/α in response to a unit step input of the discharge current Ib as shown in FIG. 5. In the case of continuous discharge of the battery 50 at the discharge current Ib=α/β, the deterioration factor D accordingly converges to a value 1.0. By taking into account this characteristic of the deterioration factor D, the procedure of the embodiment sets the restriction start threshold value Dtag and the gains on the assumption that a reference value of the deterioration factor D is equal to 1.0. When the charge-discharge current Ib and the battery voltage Vb with convergence of the deterioration factor D to the reference value 1.0 are respectively given as Ib=α/β=Ib_D1 and Vb=Vb_D1, an electric power Pb_D1 of the battery 50 in this condition is expressed as Pb_D1=Ib_D1×Vb_D1. Ignoring the integral term in Equation (4) with consideration of the response gives a relation of Equation (5) with convergence of the deterioration factor D to the reference value 1.0 (see FIG. 6):

$$Wout = Woutb + Kp \cdot (Dtag - 1.0) = Pb\#D1 \quad (5)$$

Time differentiation of both sides of Equation (4) (on the assumption of fixed values for Woutb, Dtag, Kp, and Ki) gives Equation (6):

$$dWout/dt = -Kp \cdot dD/dt + Ki \cdot (Dtag - D) \quad (6)$$

In the transient state, the time rate of change of the integral term is generally smaller than the time rate of change of the proportional. Substitution of Equation (1) into Equation (6) with ignoring the second term on the right side of Equation (6) based on the above fact gives a relation of Equation (7):

$$dWout/dt = -Kp \cdot dD/dt = -Kp \cdot (-\alpha \cdot D + \beta \cdot Ib) \quad (7)$$

According to the relation of Equation (7), the smaller value of the deterioration factor D and the greater value of the charge-discharge current Ib as the discharge current set the greater negative value to a time rate of change dWout/dt of the output limit Wout. Satisfaction of dWout/dt=ΔWout is required at the moment when the deterioration factor D reaches the restriction start threshold value Dtag. Here ΔWout represents a threshold limit value of the time rate of change dWout/dt of the output limit Wout depending upon the drivability of the hybrid vehicle 20. The restriction start threshold value Dtag and the gain Kp of the proportional should accordingly satisfy a relation of Equation (8):

$$\Delta Wout = -Kp \cdot (-\alpha \cdot Dtag + \beta \cdot Ib\#woutb) \quad (8)$$

Figure 7:
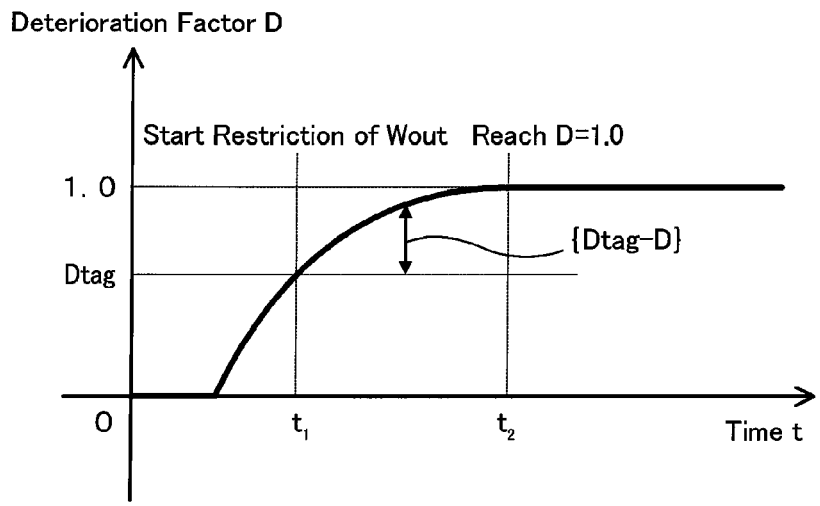
FIG. 7 is a graph showing a variation in deterioration factor D with restriction of the output limit Wout based on the deterioration factor D.

In the constraint conditions of Equations (5) and (8) given above, the restriction start threshold value Dtag and the gain Kp of the proportional are determinable with other parameters separately specified by experiments and analyses, for example, the coefficients α and β. Determination of at least the gain Kp of the proportional enables the output limit Wout to be set by the feedback control according to Equation (4), which starts when the deterioration factor D reaches or exceeds the restriction start threshold value Dtag. This gradually decreases the output limit Wout and converges the deterioration factor D to the value 1.0 as shown in FIG. 7 to prevent the deterioration start timing of the battery 50 from coming. The output limit Wout may be set by the feedback control according to Equation (4) with the adequately set gain Ki of the integral term. (for example, Kp=1.0). The deterioration factor D once approaches to the value 1.0 and then gradually decreases in the case of such modified setting of the output limit Wout. This arrangement more effectively prevents the deterioration start timing of the battery 50 from coming.

Figure 9:
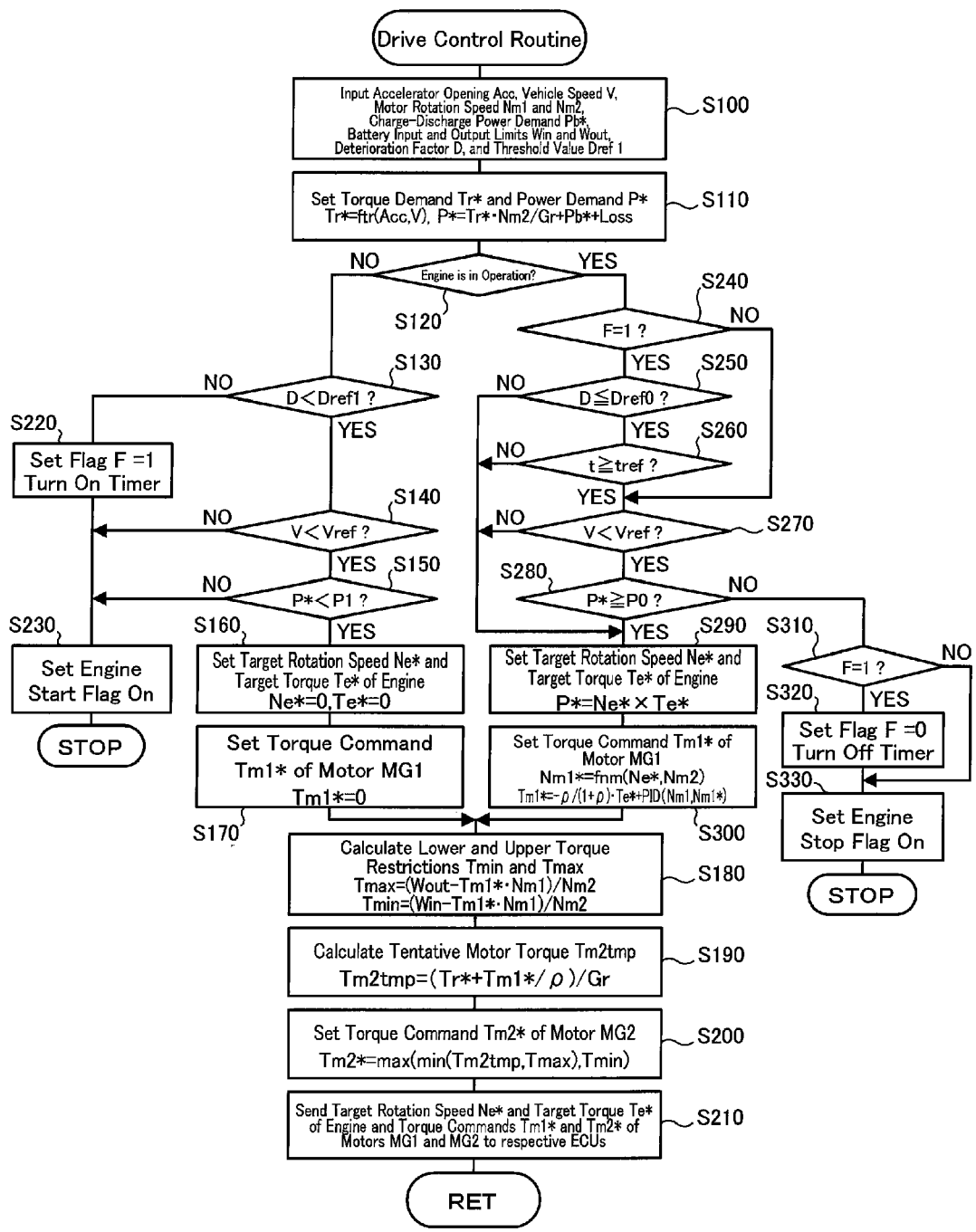
FIG. 9 is a flowchart showing a drive control routine executed by a hybrid ECU incorporated in the hybrid vehicle of the embodiment.

The description regards series of operations performed in the hybrid vehicle 20 having the configuration explained above. FIG. 9 is a flowchart showing a drive control routine, which is executed by the hybrid ECU 70 at preset time intervals, for example, at ever several msec, in the embodiment.

In the drive control routine of FIG. 9, the CPU 72 of the hybrid ECU 70 first inputs various data required for control, for example, the accelerator opening Acc from the accelerator pedal position sensor 84, the vehicle speed V from the vehicle speed sensor 87, the rotation speeds Nm1 and Nm2 of the motors MG1 and MG2, the charge-discharge power demand Pb* of the battery 50, the input limit Win and the output limit Wout of the battery 50, the deterioration factor D, and an operation stop prohibition threshold value Dref1 of the engine 22 (step S100). The rotation speeds Nm1 and Nm2 of the motors MG1 and MG2 are input from the motor ECU 40 by communication. The charge-discharge power demand Pb* and the input limit and the output limit Win and Wout of the battery 50 are input from the battery ECU 52 by communication. As clearly understood from the block diagram of FIG. 8, the charge-discharge power demand Pb* is set by restricting a charge-discharge power demand base value Pbb set based on the state of charge SOC with the input limit Win and the output limit Wout. The deterioration factor D computed as explained above is input from the battery ECU 52 by communication. The operation stop prohibition threshold value Dref1 of the engine 22 depends upon the battery temperature Tb and the state of charge SOC of the battery 50. The operation stop prohibition threshold value Dref1 is also set by the battery ECU 52 and is input from the battery ECU 52 by communication.

Figure 10:
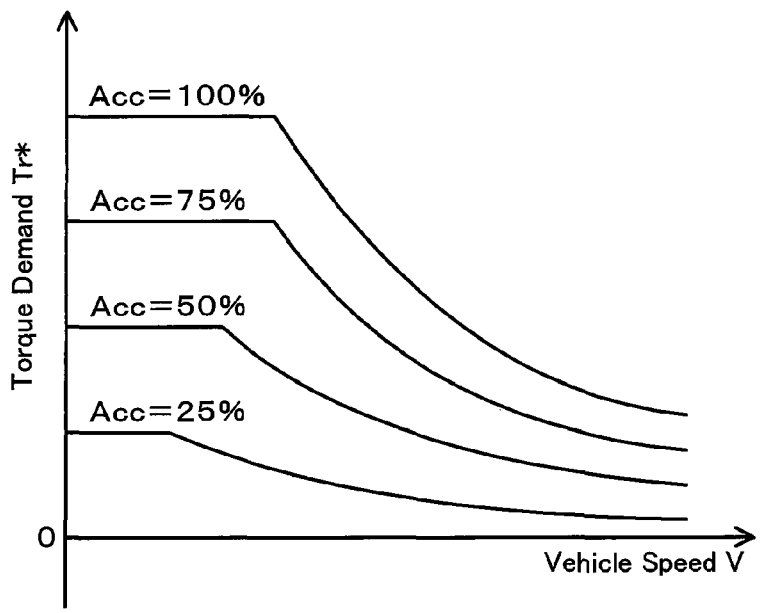
FIG. 10 shows one example of a torque demand setting map.

After the data input at step S100, the CPU 72 sets a torque demand Tr* to be output to the ring gear shaft 32a or the driveshaft linked with the drive wheels 39a and 39b and a power demand P* required for the whole hybrid vehicle 20, based on the input accelerator opening Acc and the input vehicle speed V (step S110). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 10. The power demand P* is calculated as the sum of the product of the set torque demand Tr* and a rotation speed Nr of the ring gear shaft 32a, the charge-discharge power demand Pb*, and a potential loss. The rotation speed Nr of the ring gear shaft 32a is obtained by dividing the rotation speed Nm2 of the motor MG2 by a gear ratio Gr of the reduction gear 35 or by multiplying the vehicle speed V by a preset conversion factor k.

It is then determined whether the engine 22 is in operation or is at stop (step S120). When it is determined at step S120 that the engine 22 is at stop, a comparison is made between the deterioration factor D and the operation stop prohibition threshold value Dref1 input at step S100 (step S130). When the deterioration factor D reaches or exceeds the restriction start threshold value Dtag according to the discharge of the battery 50, the battery ECU 52 restricts the output limit Wout as the allowable discharging electric power to be discharged from the battery 50 as discussed above. The greater difference between the deterioration factor D and the restriction start threshold value Dtag results in the lower output limit Wout. Especially when the deterioration factor D reaches or exceeds the restriction start threshold value Dtag, the restriction of the output limit Wout of the battery 50 may cause a failed supply of sufficient electric power from the battery 50 to the motor MG1 for cranking the engine 22 on the requirement for a start of the engine 22 in the motor drive mode of the hybrid vehicle 20 driven with the operation of the engine 22 stopped. The failed supply of sufficient electric power may result in the occurrence of a start shock or even a failed start of the engine 22. The operation stop prohibition threshold value Dref1 is specified relative to the deterioration factor D. The procedure of the embodiment allows the operation stop of the engine 22 when the deterioration factor D is less than the operation stop prohibition threshold value Dref1, while prohibiting the operation stop of the engine 22 when the deterioration factor D is not less than the operation stop prohibition threshold value Dref1. The operation stop prohibition threshold value Dref1 is set corresponding to each combination of the battery temperature Tb and the state of charge SOC to be smaller than the reference value (the value 1.0) of the deterioration factor D and basically smaller than the restriction start threshold value Dtag. Such setting aims to ensure output of a specific amount of electric power from the battery 50 even after one starting operation of the engine 22 performed when the deterioration factor D exceeds the operation stop prohibition threshold value Dref1. The specific amount of electric power is obtained as the sum of an electric power (for example, about 5 kW) required to crank and start the engine 22 by the motor MG1 in the course of another starting operation of the engine 22 and an electric power (for example, about 1 kW) required to keep the hybrid vehicle 20 driven with the output power of the motor MG2.

When it is determined at step S130 that the deterioration factor D is less than the operation stop prohibition threshold value Dref1, the operation stop of the engine 22 is allowed. In this case, the vehicle speed V input at step S100 is compared with a preset intermittent operation prohibition vehicle speed Vref (step S140). The intermittent operation prohibition vehicle speed Vref is set as a lower limit in a specific vehicle speed range where the operation of the engine 22 is required and the intermittent operation of the engine 22 is prohibited. The intermittent operation prohibition vehicle speed Vref may be set to vary according to the conditions of the battery 50, the operating conditions of the engine 22, and the driving state of the hybrid vehicle 20. When it is determined at step S140 that the input vehicle speed V is lower than the intermittent operation prohibition vehicle speed Vref, the power demand P* set at step S110 is compared with a preset engine start reference value P1 (step S150). When it is determined at step S150 that the power demand P* is less than the engine start reference value P1, the CPU 72 sets a target rotation speed Ne* and a target torque Te* of the engine 22 to 0, in order to keep the operation stop state of the engine 22 unchanged (step S160), and sets a torque command Tm1* of the motor MG1 to 0 (step S170).

The CPU 72 subsequently calculates a lower torque restriction Tmin and an upper torque restriction Tmax from the input limit Win and the output limit Wout of the battery 50, the torque command Tm1* of the motor MG1, and the current rotation speeds Nm1 and Nm2 of the motors MG1 and MG2 according to Equations (9) and (10) given below (step S180):

$$Tmin=(Win-Tm1^* \cdot Nm1)/Nm2 \quad (9)$$

$$Tmax=(Wout-Tm1^* \cdot Nm1)/Nm2 \quad (10)$$

The lower torque restriction Tmin and the upper torque restriction Tmax respectively represent allowable minimum and maximum torques to be output from the motor MG2. The CPU 72 also calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (11) given below (step S190):

$$Tm2tmp=(Tr^*+Tm1^*/\rho)/Gr \quad (11)$$

The CPU 72 then limits the calculated tentative motor torque Tm2tmp by the lower and the upper torque restrictions Tmin and Tmax to set a torque command Tm2* of the motor MG2 (step S200). Setting the torque command Tm2* of the motor MG2 in this manner restricts the torque demand Tr* to be output to the ring gear shaft 32a or the driveshaft linked with the axle in the range of the input limit Win and the output limit Wout of the battery 50. After setting the target rotation speed Ne* and the target torque Te* of the engine 22 and the torque commands Tm1* and Tm2* of the motors MG1 and MG2, the CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S210) and then goes back to step S100 to repeat the above series of processing of and after step S100. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*.

When it is determined at step S130 that the deterioration factor D is not less than the operation stop prohibition threshold value Dref1, the operation stop of the engine 22 is prohibited. The CPU 72 sets a specific flag F to 1, which represents prohibition of the operation stop of the engine 22, based on the deterioration factor D and turns on the timer 78 to start counting the time (step S220). The CPU 72 then sets an engine start flag ON to start the operation of the engine 22 (step S230) and terminate the drive control routine of FIG. 9. The specific flag F is equal to 0 in the ordinary state and is set to 1 to prohibit the operation stop of the engine 22. Namely when the deterioration factor D reaches or exceeds the operation stop prohibition threshold value Dref1, the engine start flag is set ON without the comparisons at steps S140 and S150 (that is, irrespective of the results of the comparisons). Even when it is determined at step S130 that the deterioration factor D is less than the operation stop prohibition threshold value Dref1, upon determination at step S140 that the vehicle speed V is not lower than the intermittent operation prohibition vehicle speed Vref or upon determination at step S150 that the power demand P* is not less than the engine start reference value P1, the CPU 72 sets the engine start flag ON to start the operation of the engine 22 (step S230) and terminate the drive control routine of FIG. 9. In response to setting the engine start flag ON and terminating the drive control routine of FIG. 9, the hybrid ECU 70 executes an engine start drive control routine (not shown). When the deterioration factor D is less than the operation stop prohibition threshold value Dref1 in the operation stop state of the engine 22, the engine 22 is restarted upon satisfaction of the engine start conditions of steps S140 and S150. The engine start drive control routine drives and controls the motor MG1 to crank and start the engine 22, while driving and controlling the motor MG2 to ensure output of a torque equivalent to the torque demand Tr* to the ring gear shaft 32a while canceling a torque as a reactive force to a drive torque applied to the ring gear shaft 32a in the course of cranking the engine 22. The engine start flag is set OFF on completion of the engine start drive control routine. The hybrid ECU 70 again executes the drive control routine of FIG. 9 in response to setting the engine start flag OFF.

Figure 11:
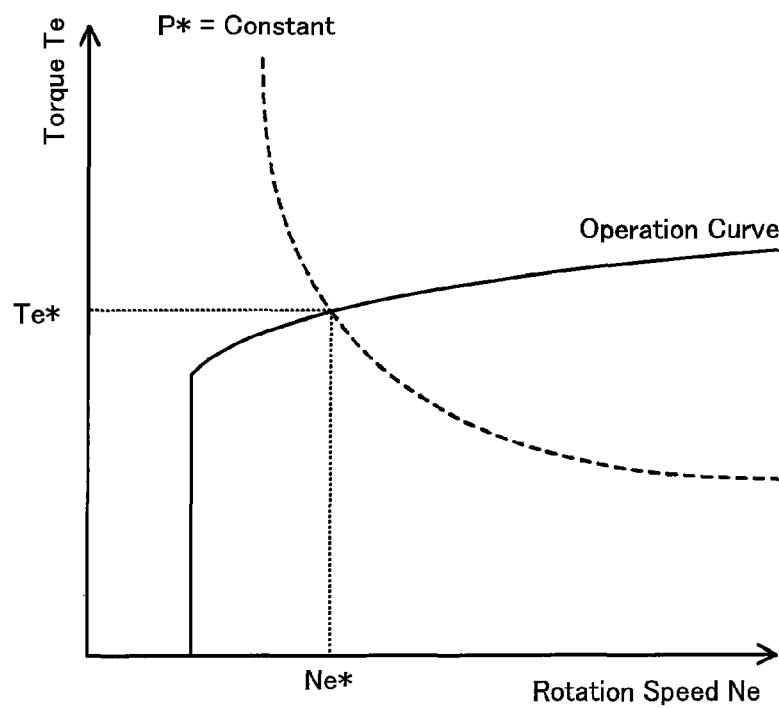
FIG. 11 shows an operation curve of an engine and a correlation curve of a target rotation speed Ne* and a target torque Te* of the engine.

When it is determined at step S120 that the engine 22 is in operation, the CPU 72 determines whether the specific flag F is equal to 1 (step S240). When the specific flag F is equal to 0, it is assumed that the current operation of the engine 22 is not triggered by an engine start based on the value of the deterioration factor D. In this case, the vehicle speed V input at step S100 is compared with the intermittent operation prohibition vehicle speed Vref (step S270). When it is determined at step S270 that the vehicle speed V is lower than the intermittent operation prohibition vehicle speed Vref, the power demand P* set at step S110 is compared with a preset engine stop reference value P0 (step S280). Upon determination at step S270 that the vehicle speed V is not lower than the intermittent operation prohibition vehicle speed Vref or upon determination step S280 that the power demand P* is not less than the engine stop reference value P0, it is assumed that the power demand P* set at step S110 is fully supplied by the engine 22. On this assumption, the target rotation speed Ne* and the target torque Te* defining a target drive point of the engine 22 are set, based on the power demand P* (step S290). In this embodiment, the target rotation speed Ne* and the target torque Te* of the engine 22 are determined according to an operation curve of ensuring efficient operation of the engine 22 and a curve of the power demand P*. FIG. 11 shows an operation curve of the engine 22 and a correlation curve of rotation speed Ne and torque Te. As clearly shown in FIG. 11, the target rotation speed Ne* and the target torque Te* are given as an intersection of the operation curve and the correlation curve of constant power demand P* (=Ne*×Te*).

The CPU 72 subsequently calculates a target rotation speed Nm1* of the motor MG1 from the target rotation speed Ne* of the engine 22, the rotation speed Nr (=Nm2/Gr) of the ring gear shaft 32a, and the gear ratio ρ (=number of teeth of the sun gear 31/number of teeth of the ring gear 32) of the power distribution integration mechanism 30 according to Equation (12) given below, while calculating the torque command Tm1* as a torque to be output from the motor MG1 from the calculated target rotation speed Nm1* and the current rotation speed Nm1 of the motor MG1 according to Equation (13) given below (step S300):

$$Nm1^* = Ne^* \cdot (1+\rho)/\rho - Nm2/(Gr \cdot \rho) \quad (12)$$

$$Tm1^* = -\rho/(1+\rho) \cdot Te^* + k1 \cdot (Nm1^* - Nm1) + k2 \cdot \int (Nm1^* - Nm1)dt \quad (13)$$

Figure 12:
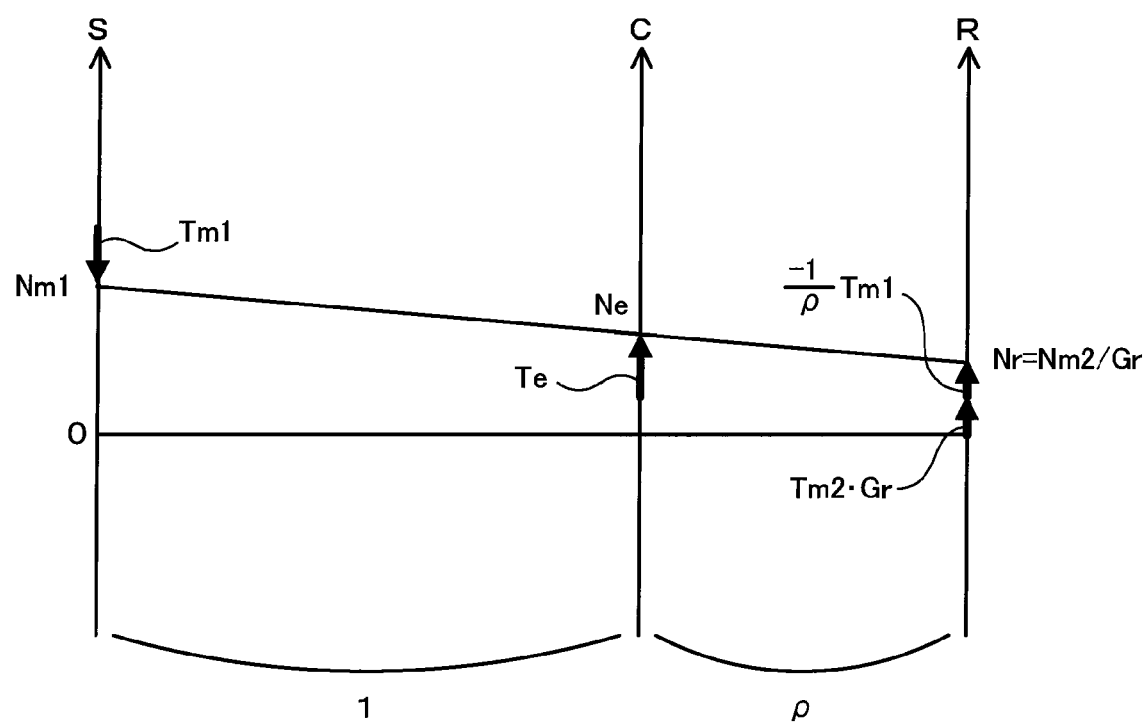
FIG. 12 is an alignment chart showing torque-rotation speed dynamics of respective rotational elements included in a power distribution integration mechanism mounted on the hybrid vehicle of the embodiment.

Equation (12) is a dynamic relational expression of respective rotational elements included in the power distribution integration mechanism 30. FIG. 12 is an alignment chart showing torque-rotation speed dynamics of the respective rotational elements included in the power distribution integration mechanism 30. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (12) for determining the target rotation speed Nm1* of the motor MG1 is readily introduced from the relation of the rotation speed in this alignment chart. Equation (13) is a relational expression of feedback control to drive and rotate the motor MG1 at the target rotation speed Nm1*. In Equation (13) given above, 'k1' in the second term and 'k2' in the third term on the right side respectively denote a gain of the proportional and a gain of the integral term. After setting the torque command Tm1* of the motor MG1, the CPU 72 performs the processing of steps S180 to S210 as described above and goes back to step S100 to repeat the above series of processing of and after step S100. Equation (11) used in the calculation of step S190 is also readily introduced from the alignment chart of FIG. 12.

Upon subsequent determination that the engine 22 is in operation at step S120, that the specific flag F is equal to 0 at step S240, and that the power demand P* is less than the engine stop reference value P0 at step S280, it is determined at step S310 that the specific flag F is equal to 0. The CPU 72 then sets an engine stop flag ON to stop the operation of the engine 22 (step S330) and terminates the drive control routine of FIG. 9. In response to setting the engine stop flag ON, the hybrid ECU 70 executes an engine stop control routine (not shown). The engine stop control routine sets the torque command Tm1* of the motor MG1 to a negative torque for restricting the rotation of the engine 22 until the rotation speed Ne of the engine 22 decreases to a predetermined pre-stop rotation speed in the state of stopping the fuel supply to the engine 22. The engine stop control routine sets the torque command Tm1* of the motor MG1 to a positive torque for keeping the piston at a certain position at a specific timing when the rotation speed Ne of the engine 22 reaches the pre-stop rotation speed. The engine stop control routine also sets the torque command Tm2* of the motor MG2 to ensure output of a torque equivalent to the torque demand Tr* to the ring gear shaft 32a. The engine stop flag is set OFF on completion of the engine stop control routine. The hybrid ECU 70 again executes the drive control routine of FIG. 9 in response to setting the engine stop flag OFF.

Upon subsequent determination that the engine 22 is in operation at step S120 and that the specific flag F is equal to 1 at step S240, it is assumed that the current operation of the engine 22 is triggered by an engine start based on the value of the deterioration factor D. In this case, the deterioration factor D input at step S100 is compared with a preset operation stop permission threshold value Dref0 (step S250). The operation stop permission threshold value Dref0 is set to a fixed value, for example, a value '0', which is smaller than the reference value of the deterioration factor D and the operation stop prohibition threshold value Dref1. After the engine start based on the deterioration factor D, the procedure of the embodiment prohibits the operation stop of the engine 22 when the deterioration factor D is greater than the operation stop permission threshold value Dref0, while allowing the operation stop of the engine 22 when the deterioration factor D is not greater than the operation stop permission threshold value Dref0. Upon determination at step S250 that the deterioration factor D is greater than the operation stop permission threshold value Dref0, the CPU 72 prohibits the operation stop of the engine 22, performs the processing of steps S290 and S300 and steps S180 to S210 described above, and goes back to step S100 to repeat the above series of processing of and after step S100.

Upon determination at step S250 that the deterioration factor D is not greater than the operation stop permission threshold value Dref0, on the other hand, the CPU 72 determines whether a counted time t by the timer 78, that is, a time elapsed since a start command of the engine 22, reaches or exceeds a specified wait time tref (step S260). When it is determined at step S260 that the counted time t has not yet reached the wait time tref, the CPU 72 does not allow but prohibits the operation stop of the engine 22, performs the processing of steps S290 and S300 and steps S180 to S210 described above, and goes back to step S100 to repeat the above series of processing of and after step S100. The wait time tref used as the criterion at step S260 is set to a certain time period between a start of the engine 22 and a subsequent stop of the engine 22 that does not make the standard driver feel uncomfortable or odd, for example, 20 seconds to 30 seconds. The wait time tref is specified by taking into account a time period required for completion of the start of the engine 22 after setting the engine start flag ON at step S230 (after giving the start command of the engine 22). Upon subsequent determination that the deterioration factor D is not greater than the operation stop permission threshold value Dref0 at step S250 and that the counted time t reaches or exceeds the wait time tref at step S260, the vehicle speed V input at step S100 is compared with the intermittent operation prohibition vehicle speed Vref (step S270). When it is determined at step S270 that the vehicle speed V is lower than the intermittent operation prohibition vehicle speed Vref, the power demand P* set at step S110 is compared with the engine stop reference value P0 (step S280).

Upon subsequent determination that the deterioration factor D is not greater than the operation stop permission threshold value Dref0 at step S250, that the counted time t reaches or exceeds the wait time tref at step S260, and the power demand P* is not less than the engine stop reference value P0 at step S280, it is assumed that the power demand P* set at step S110 is supplied by the engine 22. On this assumption, the target rotation speed Ne* and the target torque Te* defining the target drive point of the engine 22 are set, based on the power demand P* (step S290). Upon subsequent determination that the deterioration factor D is not greater than the operation stop permission threshold value Dref0 at step S250, that the counted time t reaches or exceeds the wait time tref at step S260, and the power demand P* is less than the engine stop reference value P0 at step S280, the processing flow goes to step S310. After the processing of step S310, the CPU 72 sets the specific flag F to 0 and turns off the timer 78 to stop the time count (step S320), sets the engine stop flag ON (step S330), and terminates the drive control routine of FIG. 9. In this case, the hybrid ECU 70 also executes the engine stop control routine (not shown) in response to setting the engine stop flag ON. As discussed above, in the hybrid vehicle 20 of the embodiment, once the engine 22 starts in response to prohibition of the operation stop of the engine 22 based on the deterioration factor D, the operation stop of the engine 22 is not allowed irrespective of the value of the deterioration factor D until elapse of a certain time period since the start of the engine 22 (≈wait time tref−engine start time). After elapse of the certain time period since the start of the engine 22, when the deterioration factor D is not greater than the operation stop permission threshold value Dref0, the operation of the engine 22 is stopped upon satisfaction of the engine stop conditions of steps S270 and S280.

In the hybrid vehicle 20 of the embodiment described above, the battery ECU 52 computes the deterioration factor D from the integrated value of the charge-discharge current Ib. The deterioration factor D varies according to the charge or discharge of the battery 50 and represents start of deterioration of the battery 50 when exceeding the specific reference value. When the deterioration factor D reaches or exceeds the operation stop prohibition threshold value Dref1, which is smaller than the reference value, in the motor drive mode of the hybrid vehicle 20 driven with the operation of the engine 22 stopped, the operation stop of the engine 22 is prohibited (steps S130, S220, and S230). The engine 22 and the motors MG1 and MG2 are then controlled to ensure output of a torque equivalent to the torque demand Tr* to the ring gear shaft 32a or the driveshaft, accompanied with the start and the operation of the engine 22 (steps S290, S300, and S180 to S210). After prohibition of the operation stop of the engine 22 based on the deterioration factor D, when the deterioration factor D decreases to or below the operation stop permission threshold value Dref0, which is smaller than the reference value, the operation stop of the engine 22 is allowed (steps S250 to S280). The engine 22 and the motors MG1 and MG2 are then controlled to ensure output of a torque equivalent to the torque demand Tr* to the ring gear shaft 32a or the driveshaft, accompanied with the operation or the operation stop of the engine 22 (steps S290, S300, and S180 to S210, and S330). As discussed above, when the deterioration factor D reaches or exceeds the operation stop prohibition threshold value Dref1, the engine 22 is operated to restrict the discharge from the battery 50 and lower the discharge current. Such restriction effectively prevents deterioration of the battery 50 due to the continuous discharge. After prohibition of the operation stop of the engine 22 based on the deterioration factor D, when the deterioration factor D decreases to or below the operation stop permission threshold value Dref0, which is smaller than the reference value, the operation stop of the engine 22 is allowed. In this state, an appropriate operation stop of the engine 22 desirably improves the fuel consumption. In this manner, the hybrid vehicle 20 of the embodiment improves the fuel consumption, while preventing deterioration of the battery 50.

In the case of a decrease of the deterioration factor D to or below the operation stop permission threshold value Dref0 according to the charge of the battery 50 after the prohibition of the operation stop of the engine 22 based on the deterioration factor D, limitless permission of the operation stop of the engine 22 may cause frequent stops and restarts of the engine 22. By taking into account this potential, the hybrid vehicle 20 of the embodiment does not allow the operation stop of the engine 22 irrespective of the value of the deterioration factor D until elapse of the certain time period since the start of the engine 22, once the engine 22 is started in response to prohibition of the operation stop of the engine 22 based on the deterioration factor D (steps S240 to S260, S290, S300, and S180 to S210). Such prohibition of the engine operation stop prevents a stop of the engine 22 within a relatively short time period after a start of the engine 22 based on the deterioration factor D. This arrangement effectively prevents the driver from feeling odd and uncomfortable due to frequent stops and starts of the engine 22 based on the deterioration factor D, which is not apparently correlated to the driver's accelerating operations. The wait time tref used as the criterion at step S260 in the drive control routine of FIG. 9 may not be a fixed value but may be varied, for example, with a variation in accelerator opening Acc.

The deterioration factor D is based on the integrated value of the charge-discharge current Ib flowing through the battery 50 and thus adequately represents the degree of deterioration of the battery 50. The above series of processing based on the deterioration factor D is especially preferable for the hybrid vehicle 20 equipped with the battery 50 such as the lithium ion battery that starts deterioration due to the continuous discharge at a high current level even when the inter-terminal voltage Vb has not yet reached the lower limit voltage in the specific voltage range of ensuring sufficient battery performances. The deterioration factor D is, however, not restricted to the lithium ion battery but is computable with regard to various other types of batteries, for example, a nickel hydrogen battery. Any suitable type of secondary battery other than the lithium ion battery may be adopted for the battery 50 of the hybrid vehicle 20. When the deterioration factor D is not less than the restriction start threshold value Dtag that is smaller than the reference value 1.0, the output limit Wout as the allowable discharging electric power to be discharged from the battery 50 is restricted to keep the deterioration factor D at or below the reference value 1.0. Such restriction effectively prevents deterioration of the battery 50 due to the continuous discharge at a high current level. Setting the smaller value to the output limit Wout in response to the greater difference between the restriction start threshold value Dtag and the deterioration factor D ensures adequate restriction of the discharge from the battery 50.

Figure 13:
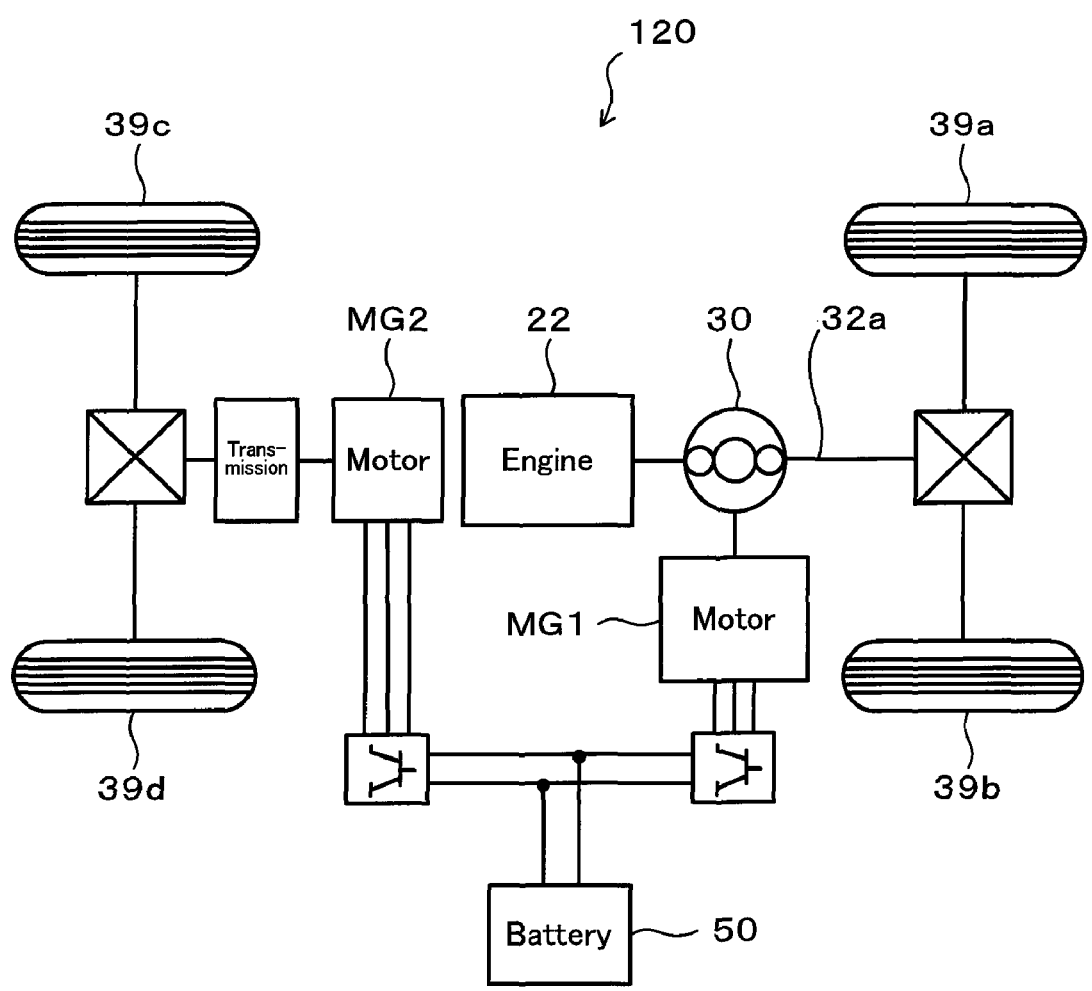
FIG. 13 schematically illustrates the configuration of another hybrid vehicle in one modified example.
Figure 14:
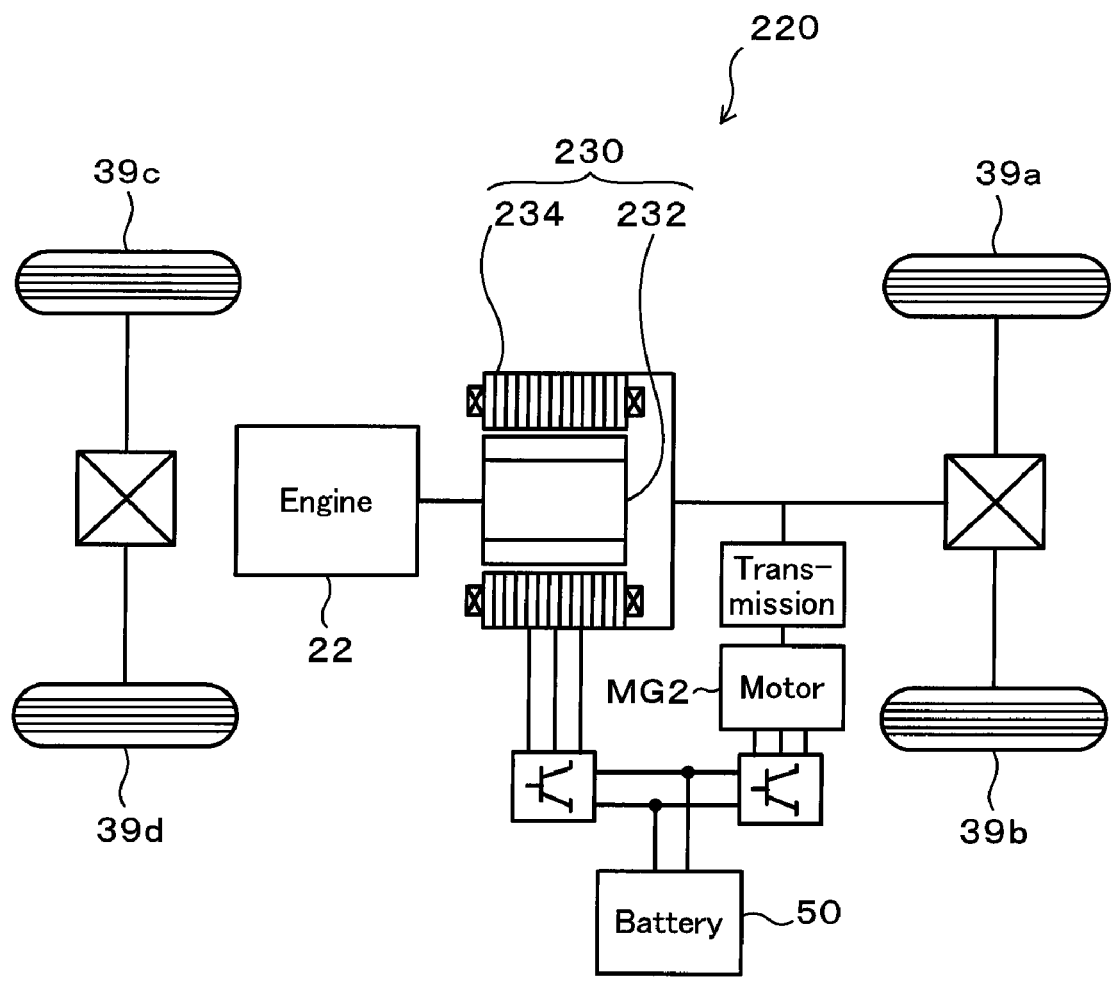
FIG. 14 schematically illustrates the configuration of still another hybrid vehicle in another modified example.

In the drive control routine of FIG. 9, the condition that the vehicle speed V is not lower than the intermittent operation prohibition vehicle speed Vref or the condition that the power demand P* is not less than the engine start reference value P1 in combination with the vehicle speed V of lower than the intermittent operation prohibition vehicle speed Vref is adopted as the engine start condition. The engine start condition is, however, not restricted to these conditions but may be, for example, the condition that the cooling water temperature of the engine 22 is lower than a preset reference temperature range, for example, 45 to 55° C., or the condition that the state of charge SOC of the battery 50 decreases below a specific management range. In the hybrid vehicle 20 of the embodiment, the ring gear shaft 32a or the driveshaft is linked with the motor MG2 via the reduction gear 35 that reduces the rotation speed of the motor MG2 and transmits the reduced rotation speed to the ring gear shaft 32a. The reduction gear 35 may be replaced with a transmission that has two different speeds Hi and Lo or three or a greater number of different speeds and is designed to change the rotation speed of the motor MG2 and transmits the changed rotation speed to the ring gear shaft 32a. In the hybrid vehicle 20 of the embodiment, the power of the motor MG2 is subjected to speed reduction by the reduction gear 35 and is output to the ring gear shaft 32a. The technique of the invention is, however, not restricted to the hybrid vehicle of this configuration but is also applicable to a hybrid vehicle 120 of a modified configuration shown in FIG. 13. In the hybrid vehicle 120 of FIG. 13, the power of the motor MG2 is output to another axle (an axle linked with wheels 39c and 39d) that is different from the axle connecting with the ring gear shaft 32a (the axle linked with the drive wheels 39a and 39b). In the hybrid vehicle 20 of the embodiment, the power of the engine 22 is output via the power distribution integration mechanism 30 to the ring gear shaft 32a or the driveshaft linked with the drive wheels 39a and 39b. The technique of the invention is, however, not restricted to the hybrid vehicle of this configuration but is also applicable to a hybrid vehicle 220 of another modified configuration shown in FIG. 14. The hybrid vehicle 220 of FIG. 14 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 39a and 39b. The pair-rotor motor 230 transmits part of the output power of the engine 22 to the driveshaft, while converting the residual engine output power into electric power. The technique of the invention is applicable to a hybrid vehicle of any configuration equipped with an engine arranged to output power for driving the vehicle, a motor arranged to transmit electric power to and from a battery and to input and output power for driving the vehicle, and a cell motor arranged to crank the engine with electric power supplied from the battery.

The primary elements in the embodiment and its modified examples are mapped to the primary constituents in the claims of the invention as described below. The engine 22 designed to output power to the ring gear shaft 32a in the embodiment is equivalent to the 'internal combustion engine' in the claims of the invention. The motor MG2 designed to input and output power from and to the ring gear shaft 32a in the embodiment is equivalent to the 'motor' in the claims of the invention. The battery 50 arranged to transmit electric power to and from the motor MG2 in the embodiment is equivalent to the 'accumulator' in the claims of the invention. The battery ECU 52 configured to compute the deterioration factor D from the integrated value of the charge-discharge current Ib in the embodiment corresponds to the 'deterioration factor computation module' in the claims of the invention. Here the deterioration factor D varies according to the charge or discharge of the battery 50 and represents start of deterioration of the battery 50 when exceeding the specific reference value. The hybrid ECU 70 executing the processing of steps S130 and S230 in the drive control routine of FIG. 9 in the embodiment corresponds to the 'engine operation stop prohibition module' in the claims of the invention. The hybrid ECU 70 executing the processing of steps S250 and S260 in the drive control routine of FIG. 9 in the embodiment corresponds to the 'engine operation stop permission module' in the claims of the invention. The hybrid ECU 70 executing the processing of step S110 in the drive control routine of FIG. 9 in the embodiment corresponds to the 'driving force demand setting module' in the claims of the invention. The combination of the hybrid ECU 70 executing the drive control routine of FIG. 9 with the engine ECU 24 and the motor ECU 40 in the embodiment is equivalent to the 'controller' in the claims of the invention. The combination of the motor MG1 and the power distribution integration mechanism 30 in the embodiment or the pair-rotor motor 230 in the modified example is equivalent to the 'electric power-mechanical power input output assembly' in the claims of the invention. The motor MG1 in the embodiment or the pair-rotor motor 230 in the modified example corresponds to the 'motor for power generation' in the claims of the invention. The power distribution integration mechanism 30 in the embodiment corresponds to the 'three shaft-type power input output structure' in the claims of the invention.

The 'internal combustion engine' is not restricted to the engine 22 designed to consume a hydrocarbon fuel, such as gasoline or light oil, and thereby output power, but may be an internal combustion engine of any other design, for example, a hydrogen engine. The 'motor' or the 'motor for power generation' is not restricted to the motor MG2 or the motor MG1 constructed as a synchronous motor generator but may have any other configuration or design, for example, an induction motor. The 'deterioration factor computation module' is not restricted to the battery ECU 52 but may be implemented by any configuration of computing a deterioration factor based on a value of electric current flowing through the accumulator, the deterioration factor has characteristic of increasing in accordance with discharge of the accumulator and decreasing in accordance with charge of the accumulator, the deterioration factor represents start of deterioration of the accumulator when exceeding a specific reference value. The 'engine operation stop prohibition module' is not restricted to the hybrid ECU 70 but may be implemented by any configuration of prohibiting an operation stop of the internal combustion engine when the computed deterioration factor reaches or exceeds a preset operation stop prohibition threshold value that is smaller than the specific reference value. The 'engine operation stop permission module' is not restricted to the hybrid ECU 70 but may be implemented by any configuration of allowing the operation stop of the internal combustion engine when the computed deterioration factor decreases to or below a preset operation stop permission threshold value that is smaller than the specific reference value, after prohibition of the operation stop of the internal combustion engine by the engine operation stop prohibition module. The 'driving force demand setting module' is not restricted to the configuration of setting a torque demand based on the accelerator opening and the vehicle speed but may be implemented by any other suitable configuration, for example, a configuration of setting a driving force demand based on only the accelerator opening. The 'controller' is not restricted to the combination of the hybrid ECU 70, the engine ECU 24, and the motor ECU 40 but may be actualized by any other suitable configuration, for example, a single electronic control unit. The above mapping of the primary elements in the embodiment and its modified examples to the primary constituents in the claims of the invention is not restrictive in any sense but is only illustrative for concretely describing the modes of carrying out the invention.

The embodiment and its modified examples discussed above are to be considered in all aspects as illustrative and not restrictive. There may be many other modifications, changes, and alterations without departing from the scope or spirit of the main characteristics of the present invention.

The technique of the present invention is preferably applied to the manufacturing industries of the power output apparatuses, the driving systems, and the vehicles.

The disclosure of Japanese Patent Application No. 2008-32075 filed on Feb. 13, 2008 including specification, drawings and claims is incorporated herein by reference in its entirety.

What is claimed is:

1. A vehicle with drive wheels connected to a driveshaft, the vehicle comprising:
    an internal combustion engine arranged to output power to the driveshaft;
    a motor arranged to input and output power from and to the driveshaft or another axle different from the driveshaft;
    an accumulator arranged to transmit electric power to and from the motor;
    a deterioration factor computation module configured to compute a deterioration factor based on a value of electric current flowing through the accumulator, the deterioration factor having characteristic of increasing in accordance with discharge of the accumulator and decreasing in accordance with charge of the accumulator, the deterioration factor representing start of deterioration of the accumulator when exceeding a specific reference value;
    an engine operation stop prohibition module configured to prohibit an operation stop of the internal combustion engine when the computed deterioration factor reaches or exceeds a preset operation stop prohibition threshold value that is smaller than the specific reference value;
    an engine operation stop permission module configured to allow the operation stop of the internal combustion engine when the computed deterioration factor decreases to or below a preset operation stop permission threshold value that is smaller than the specific reference value, after prohibition of the operation stop of the internal combustion engine by the engine operation stop prohibition module;
    a driving force demand setting module configured to set a driving force demand required for the driveshaft; and
    a controller configured to control the internal combustion engine and the motor so that power based on the set driving force demand is outputted to the driveshaft with an operation of the internal combustion engine in response to prohibition of the operation stop by the engine operation stop prohibition module or with the operation stop of the internal combustion engine in response to permission of the operation stop by the engine operation stop permission module.

2. A driving system incorporated with an internal combustion engine and an accumulator in a power output apparatus constructed to output power to at least one driveshaft, the driving system comprising:
    a motor arranged to transmit electric power to and from the accumulator and to output power to the driveshaft;
    a deterioration factor computation module configured to compute a deterioration factor based on a value of electric current flowing through the accumulator, the deterioration factor having characteristic of increasing in accordance with discharge of the accumulator and decreasing in accordance with charge of the accumulator, the deterioration factor representing start of deterioration of the accumulator when exceeding a specific reference value;
    an engine operation stop prohibition module configured to prohibit an operation stop of the internal combustion engine when the computed deterioration factor reaches or exceeds a preset operation stop prohibition threshold value that is smaller than the specific reference value;
    an engine operation stop permission module configured to allow the operation stop of the internal combustion engine when the computed deterioration factor decreases to or below a preset operation stop permission threshold value that is smaller than the specific reference value, after prohibition of the operation stop of the internal combustion engine by the engine operation stop prohibition module;
    a driving force demand setting module configured to set a driving force demand required for the driveshaft; and
    a controller configured to control the internal combustion engine and the motor so that power based on the set driving force demand is outputted to the driveshaft with an operation of the internal combustion engine in response to prohibition of the operation stop by the engine operation stop prohibition module or with the operation stop of the internal combustion engine in response to permission of the operation stop by the engine operation stop permission module.

3. A control method of a power output apparatus including: at least one drive shaft; an internal combustion engine arranged to output power to the driveshaft; a motor arranged to input and output power from and to the driveshaft; and an accumulator arranged to transmit electric power to and from the motor, the control method comprising the steps of:

(a) computing a deterioration factor based on a value of electric current flowing through the accumulator, the deterioration factor having characteristic of increasing in accordance with discharge of the accumulator and decreasing in accordance with charge of the accumulator, the deterioration factor representing start of deterioration of the accumulator when exceeding a specific reference value;

(b) prohibiting an operation stop of the internal combustion engine when the deterioration factor computed in the step (a) reaches or exceeds a preset operation stop prohibition threshold value that is smaller than the specific reference value, and allowing the operation stop of the internal combustion engine when the deterioration factor computed in the step (a) decreases to or below a preset operation stop permission threshold value that is smaller than the specific reference value, after prohibition of the operation stop of the internal combustion engine based on the deterioration factor; and (c) controlling the internal combustion engine and the motor so that power based on a driving force demand which is required for the driveshaft is outputted to the driveshaft with an operation or the operation stop of the internal combustion engine in response to prohibition or permission of the operation stop in the step (b).

4. A power output apparatus constructed to output power to at least one driveshaft, the power output apparatus comprising:

an internal combustion engine arranged to output power to the driveshaft;

a motor arranged to input and output power from and to the driveshaft;

an accumulator arranged to transmit electric power to and from the motor;

a deterioration factor computation module configured to compute a deterioration factor based on a value of electric current flowing through the accumulator, the deterioration factor having characteristic of increasing in accordance with discharge of the accumulator and decreasing in accordance with charge of the accumulator, the deterioration factor representing start of deterioration of the accumulator when exceeding a specific reference value;

an engine operation stop prohibition module configured to prohibit an operation stop of the internal combustion engine when the computed deterioration factor reaches or exceeds a preset operation stop prohibition threshold value that is smaller than the specific reference value;

an engine operation stop permission module that does not allow the operation stop of the internal combustion engine irrespective of the value of the computed deterioration factor until elapse of a certain time period since the start of the internal combustion engine, when the internal combustion engine is started in response to prohibition of the operation stop of the internal combustion engine by the engine operation stop prohibition module in an operation stop state of the internal combustion engine, the engine operation stop permission module allowing the operation stop of the internal combustion engine when the computed deterioration factor decreases to or below a preset operation stop permission threshold value that is smaller than the specific reference value after the elapse of the certain time period since the start of the internal combustion engine;

a driving force demand setting module configured to set a driving force demand required for the driveshaft; and a controller configured to control the internal combustion engine and the motor so that power based on the set driving force demand is outputted to the driveshaft with an operation of the internal combustion engine in response to prohibition of the operation stop by the engine operation stop prohibition module or with the operation stop of the internal combustion engine in response to permission of the operation stop by the engine operation stop permission module.

5. A driving system incorporated with an internal combustion engine and an accumulator in a power output apparatus constructed to output power to at least one driveshaft, the driving system comprising:

a motor arranged to transmit electric power to and from the accumulator and to output power to the driveshaft;

a deterioration factor computation module configured to compute a deterioration factor based on a value of electric current flowing through the accumulator, the deterioration factor having characteristic of increasing in accordance with discharge of the accumulator and decreasing in accordance with charge of the accumulator, the deterioration factor representing start of deterioration of the accumulator when exceeding a specific reference value;

an engine operation stop prohibition module configured to prohibit an operation stop of the internal combustion engine when the computed deterioration factor reaches or exceeds a preset operation stop prohibition threshold value that is smaller than the specific reference value;

an engine operation stop permission module that does not allow the operation stop of the internal combustion engine irrespective of the value of the computed deterioration factor until elapse of a certain time period since the start of the internal combustion engine, when the internal combustion engine is started in response to prohibition of the operation stop of the internal combustion engine by the engine operation stop prohibition module in an operation stop state of the internal combustion engine, the engine operation stop permission module allowing the operation stop of the internal combustion engine when the computed deterioration factor decreases to or below a preset operation stop permission threshold value that is smaller than the specific reference value after the elapse of the certain time period since the start of the internal combustion engine;

a driving force demand setting module configured to set a driving force demand required for the driveshaft; and a controller configured to control the internal combustion engine and the motor so that power based on the set driving force demand is outputted to the driveshaft with an operation of the internal combustion engine in response to prohibition of the operation stop by the engine operation stop prohibition module or with the operation stop of the internal combustion engine in response to permission of the operation stop by the engine operation stop permission module.

6. A control method of a power output apparatus including: at least one drive shaft; an internal combustion engine arranged to output power to the driveshaft; a motor arranged to input and output power from and to the driveshaft; and an accumulator arranged to transmit electric power to and from the motor, the control method comprising the steps of:

(a) computing a deterioration factor based on a value of electric current flowing through the accumulator, the deterioration factor having characteristic of increasing in accordance with discharge of the accumulator and decreasing in accordance with charge of the accumulator, the deterioration factor representing start of deterioration of the accumulator when exceeding a specific reference value;

(b) prohibiting an operation stop of the internal combustion engine when the computed deterioration factor reaches or exceeds a preset operation stop prohibition threshold value that is smaller than the specific reference value, the step (b) not allowing the operation stop of the internal combustion engine irrespective of the value of the computed deterioration factor until elapse of a certain time period since the start of the internal combustion engine, when the internal combustion engine is started in response to prohibition of the operation stop of the internal combustion engine by the engine operation stop prohibition module in an operation stop state of the internal combustion engine, the step (b) allowing the operation stop of the internal combustion engine when the computed deterioration factor decreases to or below a preset operation stop permission threshold value that is smaller than the specific reference value after the elapse of the certain time period since the start of the internal combustion engine;

(c) controlling the internal combustion engine and the motor so that power based on a driving force demand which is required for the driveshaft is outputted to the driveshaft with an operation or the operation stop of the internal combustion engine in response to prohibition or permission of the operation stop in the step (b).

7. A power output apparatus constructed to output power to at least one driveshaft, the power output apparatus comprising:

an internal combustion engine arranged to output power to the driveshaft;

a motor arranged to input and output power from and to the driveshaft;

an accumulator arranged to transmit electric power to and from the motor;

a deterioration factor computation module configured to compute a deterioration factor based on a value of electric current flowing through the accumulator, the deterioration factor having characteristic of increasing in accordance with discharge of the accumulator and decreasing in accordance with charge of the accumulator, the deterioration factor representing start of deterioration of the accumulator when exceeding a specific reference value;

an engine operation stop prohibition module configured to prohibit an operation stop of the internal combustion engine when the computed deterioration factor reaches or exceeds a preset operation stop prohibition threshold value that is smaller than the specific reference value;

an engine operation stop permission module configured to allow the operation stop of the internal combustion engine when the computed deterioration factor decreases to or below a preset operation stop permission threshold value that is smaller than the specific reference value, after prohibition of the operation stop of the internal combustion engine by the engine operation stop prohibition module;

a driving force demand setting module configured to set a driving force demand required for the driveshaft; and a controller configured to control the internal combustion engine and the motor so that power based on the set driving force demand is outputted to the driveshaft with an operation of the internal combustion engine in response to prohibition of the operation stop by the engine operation stop prohibition module or with the operation stop of the internal combustion engine in response to permission of the operation stop by the engine operation stop permission module.

8. The power output apparatus in accordance with claim 7, wherein the operation of the internal combustion engine is stopped upon satisfaction of a predetermined engine stop condition when the operation stop of the internal combustion engine is allowed by the engine operation stop permission module.

9. The power output apparatus in accordance with claim 7, wherein the internal combustion engine is started upon satisfaction of a predetermined engine start condition when the computed deterioration factor is less than the preset operation stop prohibition threshold value in the operation stop state of the internal combustion engine and wherein the internal combustion engine is started irrespective of satisfaction or dissatisfaction of the predetermined engine start condition when the computed deterioration factor is not less than the operation stop prohibition threshold value in the operation stop state of the internal combustion engine.

10. The power output apparatus in accordance with claim 7, wherein the deterioration factor is a value based on an integrated value of charge-discharge current flowing through the accumulator.

11. The power output apparatus in accordance with claim 7, wherein the accumulator is a lithium ion battery.

12. The power output apparatus in accordance with claim 7, the power output apparatus further having:

an electric power-mechanical power input output assembly connected with the driveshaft and with an engine shaft of the internal combustion engine and configured to output at least part of the output power of the internal combustion engine to the driveshaft and transmit electric power to and from the accumulator through input and output of electric power and mechanical power.

13. The power output apparatus in accordance with claim 12, wherein the electric power-mechanical power input output assembly includes:

a motor for power generation capable of inputting and outputting power; and a three shaft-type power input output structure connected to three shafts, the driveshaft, the engine shaft of the internal combustion engine, and a rotating shaft of the motor for power generation, and adapted to input and output power to a residual shaft based on powers input from and output to any two shafts among the three shafts.

* * * * *